United States Patent
Agrawal et al.

(10) Patent No.: US 11,709,814 B2
(45) Date of Patent: Jul. 25, 2023

(54) BUILDING OF TRIES OVER SORTED KEYS

(71) Applicant: salesforce.com, inc., San Francisco, CA (US)

(72) Inventors: Rohit Agrawal, San Francisco, CA (US); Aditya Shetty, San Francisco, CA (US); Kaushal Mittal, Dublin, CA (US); Terry Chong, Pleasanton, CA (US); Thomas Fanghaenel, Oakland, CA (US); Vaibhav Arora, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 96 days.

(21) Appl. No.: 17/079,149

(22) Filed: Oct. 23, 2020

(65) Prior Publication Data
US 2022/0129433 A1 Apr. 28, 2022

(51) Int. Cl.
G06F 16/22 (2019.01)
(52) U.S. Cl.
CPC ...... G06F 16/2264 (2019.01); G06F 16/2246 (2019.01)
(58) Field of Classification Search
CPC .......... G06F 16/2264; G06F 16/2246
See application file for complete search history.

(56) References Cited

U.S. PATENT DOCUMENTS

| | | | |
|---|---|---|---|
| 9,367,574 B2 | 6/2016 | Gupta | |
| 10,496,283 B2* | 12/2019 | Waghulde | G06F 3/061 |
| 11,048,730 B2* | 6/2021 | Jung | G06F 16/28 |
| 2013/0132408 A1 | 5/2013 | Little | |
| 2014/0195492 A1 | 7/2014 | Wilding | |
| 2017/0199818 A1 | 7/2017 | Lomet et al. | |
| 2020/0159846 A1* | 5/2020 | Dixit | G06F 16/2246 |
| 2021/0026824 A1* | 1/2021 | Wang | G06F 16/2246 |

* cited by examiner

*Primary Examiner* — Mark D Featherstone
*Assistant Examiner* — Ranjit P Doraiswamy
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to building an in-memory multi-level data structure useable to determine presence or absence of key ranges in files consisting of database records. In various embodiments, a computer system operates a database, including maintaining a set of records having a set of corresponding keys that are accessible in key-sorted order and generates a multi-level data structure that facilitates key range lookups against the set of records. The generating may include accessing ones of the set of keys in key-sorted order and determining, for a particular accessed key that includes a set of characters, an intermediate level within the multi-level data structure and a subset of the characters of the particular accessed key for insertion. The computer system may insert, starting at the intermediate level, information that identifies the subset of characters, with the inserting being performed without traversing any levels before the intermediate level.

17 Claims, 9 Drawing Sheets

US 11,709,814 B2

BUILDING OF TRIES OVER SORTED KEYS

BACKGROUND

Technical Field

This disclosure relates generally to database systems and, more specifically, to building multi-level data structures that can store information indicative of database keys.

Description of the Related Art

Modern database systems routinely implement management systems that enable users to store a collection of information in an organized manner that can be efficiently accessed and manipulated. In some cases, these database systems maintain a log-structured merge-tree (LSM tree) having multiple levels that each store information in database records as key-value pairs. An LSM tree normally includes two high-level components: an in-memory buffer and a persistent storage. During operation, a database system initially writes database records into the in-memory buffer before later flushing them to the persistent storage. As a part of flushing database records, the database system writes the database records into new files in which the database records are ordered according to their keys.

DETAILED DESCRIPTION

Figure 1:
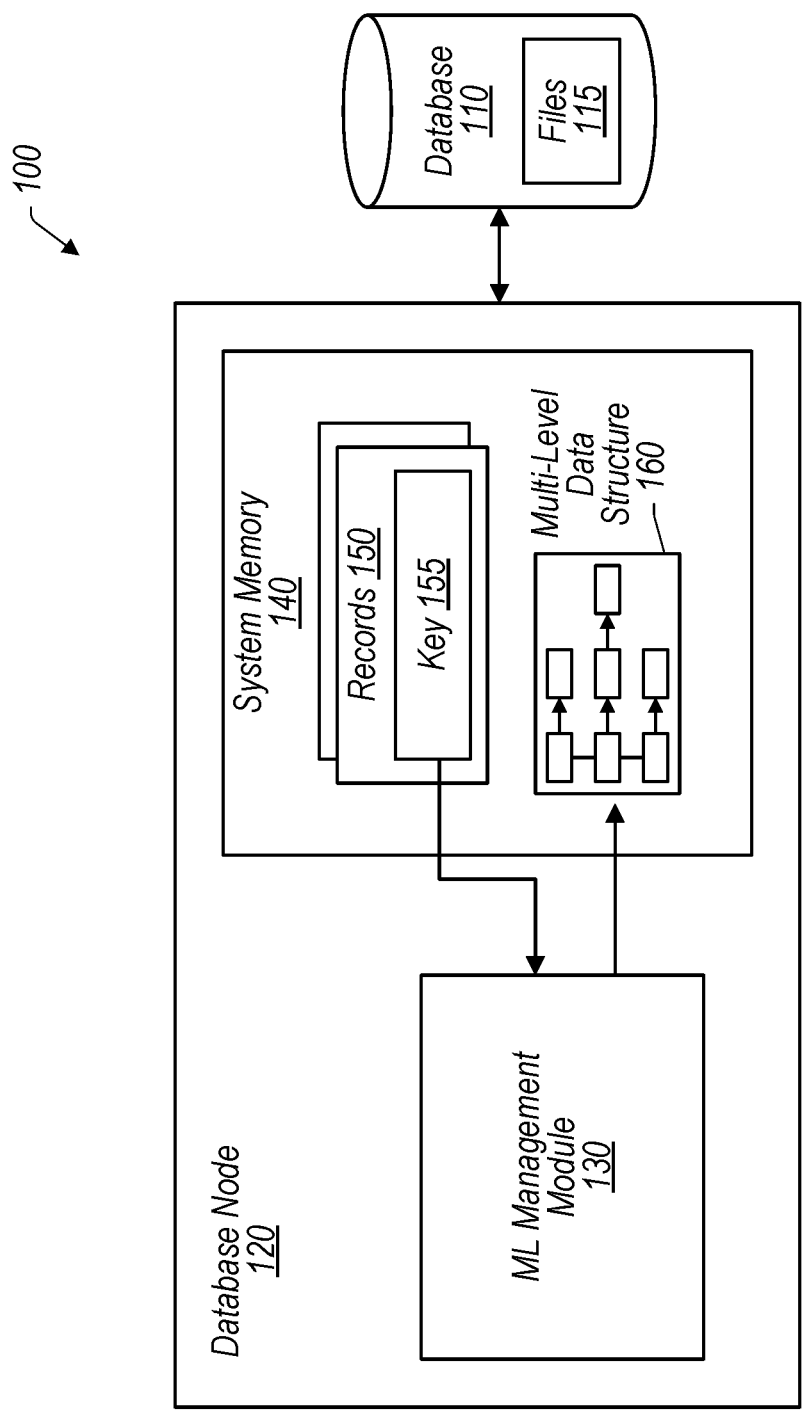
FIG. 1 is a block diagram of one embodiment of a computer system capable of building a multi-level data structure.

As mentioned, a database system often operates a database that is built around an LSM tree in which database records are stored in files written to persistent storage, with the database records being stored in key-sorted order. Thus, a file written to persistent storage contains a set of database records that associate that file with a particular key range. During operation, the database system processes transaction requests that may involve accessing databases records from files stored at the persistent storage for database keys specified in the transaction requests. If a transaction request involves searching files for database records whose keys fall within a particular key range instead of an individual key, then a particular type of probabilistic data structure, referred to as a "trie" or "trie data structure," can be used to reduce the number of files fetched from the persistent storage. Tries can also be used to determine if a particular database node includes, in its in-memory buffer, database records whose database keys fall within a specified key range.

When the database system is writing out database records to a file on persistence storage, the database system may build and store a trie in the file (or along with the file) that can be used for key range lookups on those database records. Prior approaches for building tries, however, are deficient. For example, traditional tries are implemented as tree structures and thus building a trie involves traversing the branches of the trie's tree structure to navigate to the correct location for inserting a set of nodes corresponding to a new key being inserted into the trie. Having to traverse down potentially multiple levels from a root node for each key being inserted is costly, especially when thousands of keys are inserted into the trie. Furthermore, prior approaches for building tries do not impose a tight memory bound on the size of the trie when it is being built. The present disclosure addresses, among other things, these technical problems of costly trie traversals and a lack of a tight memory bound being imposed when building a trie.

More specifically, the present disclosure recognizes that, at the point when database records are being written to persistent storage, the keys of those records are available in key-sorted order. Accordingly, the present disclosure utilizes this availability of the sorted keys to build a multi-level data structure (e.g., a trie) in system memory in an efficient manner by avoiding unnecessary level traversals when inserting keys into the multi-level data structure. Since the preceding key and the succeeding key to a current key are available to the database system, the database system may compare the current key with both the preceding key and the succeeding key to determine 1) at which level in the multi-level data structure to start adding nodes corresponding to the current key and 2) how many nodes of the current key need to be added to the multi-level data structure during the insertion of the current key.

In particular, when adding a current key, in various embodiments, the database system determines at which level to start adding nodes for the current key by comparing the current key with the preceding key to determine their overlap. The nodes that overlap between these two keys have already been inserted when the preceding key was added to the multi-level data structure and thus that prefix portion (i.e., the overlap) of the current key does not have to be added again. As a result, when adding the current key, the database system can skip traversing the levels associated with those already added nodes, thus saving time. The database system may instead begin inserting nodes for the current key at the determined starting level. Hence, the techniques of this disclosure provide an advantage of avoiding unnecessary level traversal while inserting keys into the multi-level data structure.

After determining a starting level for inserting nodes, in various embodiments, the database system compares the current key to the succeeding key to determine the number of nodes to insert in order to differentiate the current key from other keys that are inserted in the multi-level data structure. Since a key may be very lengthy, it may be desirable to not insert the entire key. Thus, the database system may identify a set of nodes to insert based on the starting level and an overlap between the current key and the succeeding key. In some embodiments, the database system then adds one additional node to the set of nodes, where the additional node corresponds to the character of the current key that occurs sequentially after the overlap between those two keys. The additional node may be the smallest amount of information capable of providing a minimum differentiation from the succeeding key to be inserted into the multi-level data structure. This may result in smaller multi-level data structures, thus providing an advantage of keeping the size of the multi-level data structures manageable.

As noted, in various embodiments, the database system is able to determine the number of nodes to insert for the current key. Thus, another advantage of building a multi-level data structure using the techniques of the present disclosure is that it is possible to determine whether the insertion of the current key will cause a predetermined memory allocation for the multi-level data structure to be exceeded. Yet another advantage is that there is no need to provide buffering for the keys before insertion into the multi-level data structure, since the keys are inserted into the multi-level data structure as their corresponding database records are being written into persistent storage. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 and a database node 120 that interacts with database 110. As further shown, database 110 includes files 115 that are a repository of database records. Also as illustrated, database node 120 includes a ML management module 130 and a system memory 140. In some embodiments, system 100 may be implemented differently than shown. For example, system 100 may include multiple database nodes 120 that interact with each other and database 110.

Database 110, in various embodiments, is a collection of information that is organized in a manner that allows for access, storage, and manipulation of that information. Accordingly, database 110 may include supporting software that allows for database node 120 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. The storage devices may store data persistently and thus database 110 may serve as a persistent storage. In various embodiments, database 110 is shared between multiple database nodes 120 such that database records 150 written into files 115 by one database node 120 are accessible by other database nodes 120. Files 115 may be stored as part of an LSM tree that is implemented at database 110.

Files 115, in various embodiments, include sets of database records 150. A database record 150, in various embodiments, includes a key-value pair that comprises data and a corresponding key 155 that is usable to look up that database record 150. For example, a database record 150 may correspond to a data row in a database table where the database record 150 specifies values for one or more attributes (or columns) associated with the database table. In various embodiments, a file 115 is associated with one or more database key ranges defined by the keys 155 of the database records 150 that are included in that file 115. Consider an example in which a file 115 stores three database records 150 associated with keys 155 "AA," "AAB," and "AC," respectively. Those three keys 155 span a database key range of AA→AC and thus that file 115 may be associated with a database key range of AA→AC.

Database node 120, in various embodiments, is hardware, software, or a combination thereof capable of providing database services, such as data storage, data retrieval, and/or data manipulation. Such database services may be provided to other components within system 100 and/or to components external to system 100. As an example, database node 120 may receive a database transaction request from an application server (not shown) that is requesting data to be written to and/or read from database 110. The database transaction request may specify an SQL SELECT command to select one or more rows from one or more database tables. The contents of a row may be defined in a database record 150 and thus database node 120 may locate and return one or more database records 150 that correspond to the selected one or more table rows. In some cases, the database transaction request may instruct database node 120 to write one or more database records 150 to database 110. In various embodiments, database node 120 initially writes database records 150 to system memory 140 before flushing those database records 150 to database 110 as files 115.

System memory 140, in various embodiments, is a volatile memory (e.g., dynamic random-access memory) or a non-volatile memory (e.g., NAND flash memory). System memory 140 may serve as a repository that temporarily stores records 150 that are written for database transactions being processed by database node 120. After a threshold number of records 150 have been written to system memory 140, in various embodiments, database node 120 flushes a set of those records 150 out to database 110 as part of new files 115. In some embodiments, database node 120 flushes records 150 after set intervals of time. System memory 140 also serves as a repository that stores in-memory multi-level data structures 160.

Figure 4:
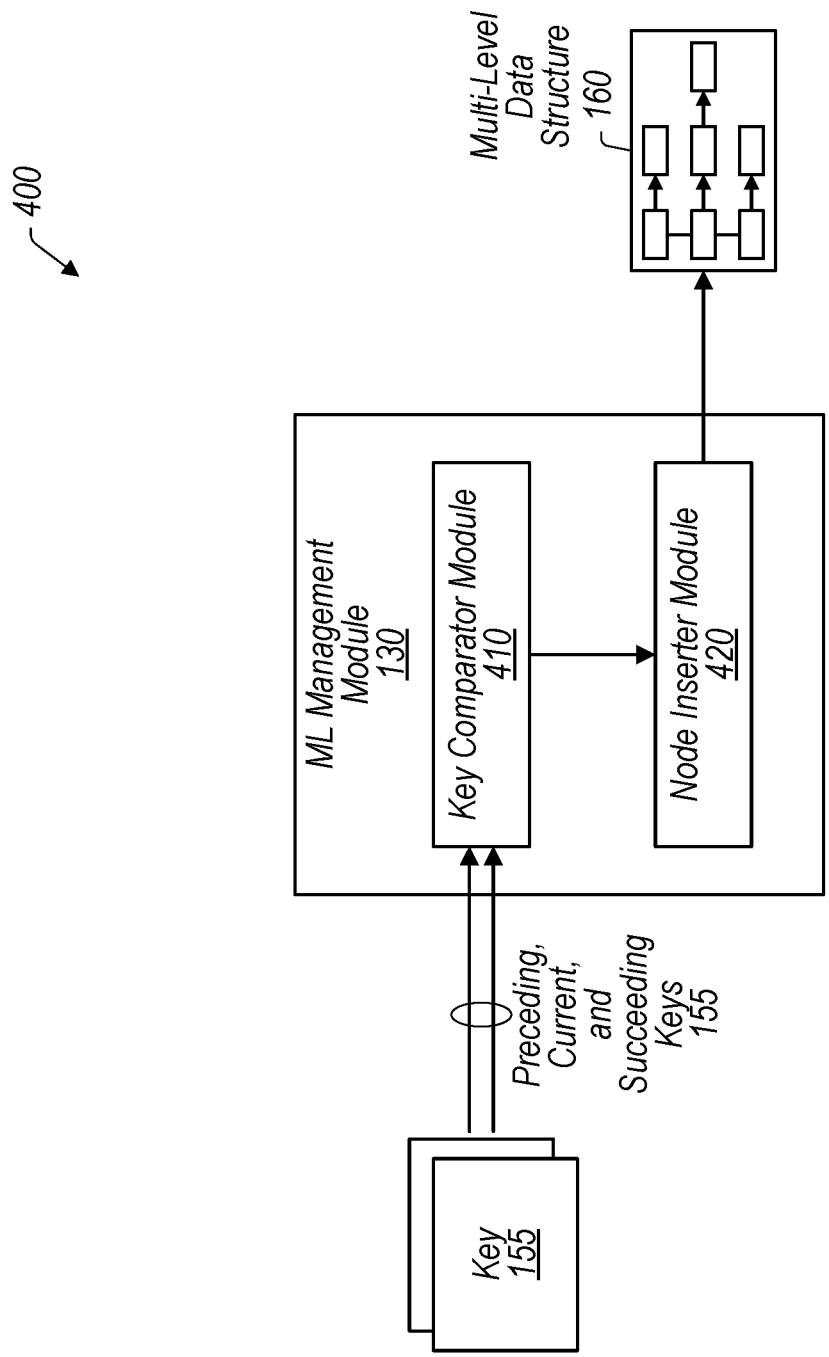
FIG. 4 is a block diagram of one embodiment in which the building of a multi-level data structure is facilitated by a ML management module 130 that inserts a set of sorted input keys into the multi-level data structure.

A multi-level (ML) data structure 160, in various embodiments, is a data structure that includes a vector structure (or simply "vector") having a set of level vectors that respectively correspond to different levels of the ML data structure 160. Each level vector may store a set of nodes that identify character values of keys 155 that have been inserted into the ML data structure 160. Accordingly, as more keys 155 are increasingly inserted into the ML data structure 160, the number of nodes of a given level vector may increase to accommodate the additional characters inserted as a result of the insertion of those keys 155. An example of an ML data structure 160 is shown in FIG. 4.

In various cases, an ML data structure 160 may be a probabilistic data structure that can provide an indication of the database key ranges associated with one or more files 115. As used herein, the term "probabilistic data structure" refers to a data structure that maintains information indicating that a particular item either does not exist or might exist at a particular location within a system. As an example, a probabilistic data structure can store information that indicates that a database record 150 does not exist or might exist within a file 115. In various embodiments, an ML data structure 160 has a reasonably smaller memory footprint than the corresponding file 115. Consequently, database node 120 may more quickly and efficiently access ML data structures 160 than accessing the corresponding files 115. As a result, using an ML data structure 160 to check for whether a certain database record 150 may be included in a given file 115 instead of directly accessing the given file 115 to check for the database record 150 can provide a substantial performance boost to system 100. The efficient building of an ML data structure 160 is described in the rest of the disclosure.

ML management module 130, in various embodiments, is a set of software routines executable to generate an ML data structure 160. As noted, at the time of flushing records 150 stored in system memory 140 to persistent storage (e.g., to files 115), the records 150 may be written out in a sorted order according to their keys 155. Since records 150 are written out in key-sorted order, in various embodiments, knowledge about the ordering of those keys 155 is available to ML management module 130. Accordingly, ML management module 130 may access a particular key 155 (which can be referred to as the "current" key 155) along with the preceding and succeeding keys 155 to that current key 155. ML management module 130 may then perform a set of comparisons involving those keys 155 as part of inserting the current key 155 into an ML data structure 160. As alluded to previously, on the basis of two comparisons, in various embodiments, ML management module 130 determines the exact number of nodes to insert into an ML data structure 160 in order to represent the current key 155. The process of determining the number of nodes to insert and the level in an ML data structure 160 at which to begin inserting them (without traversing any of the preceding levels of the ML data structure 160) is further discussed with reference to FIGS. 2-4.

As explained more fully with reference to the following figures, ML management module 130 provides an advantage over prior approaches of building tries by avoiding traversals of levels in an ML data structure 160 prior to the level at which the insertion of nodes is determined to begin while inserting nodes corresponding to a key into the ML data structure 160. Furthermore, the building of an ML data structure 160 provides another advantage over prior approaches in that the building of the ML data structure 160 is performed without the need to buffer keys 155, since the insertion of a key 155 takes place at the same time that the key's corresponding record 150 is being written to files 115 at persistent storage. A specific example to explain how ML management module 130 determines how many nodes to add to an ML data structure 160 in the context of inserting a particular key 155 among a set of sorted keys 155 is provided next with reference to FIG. 2.

Figure 2:
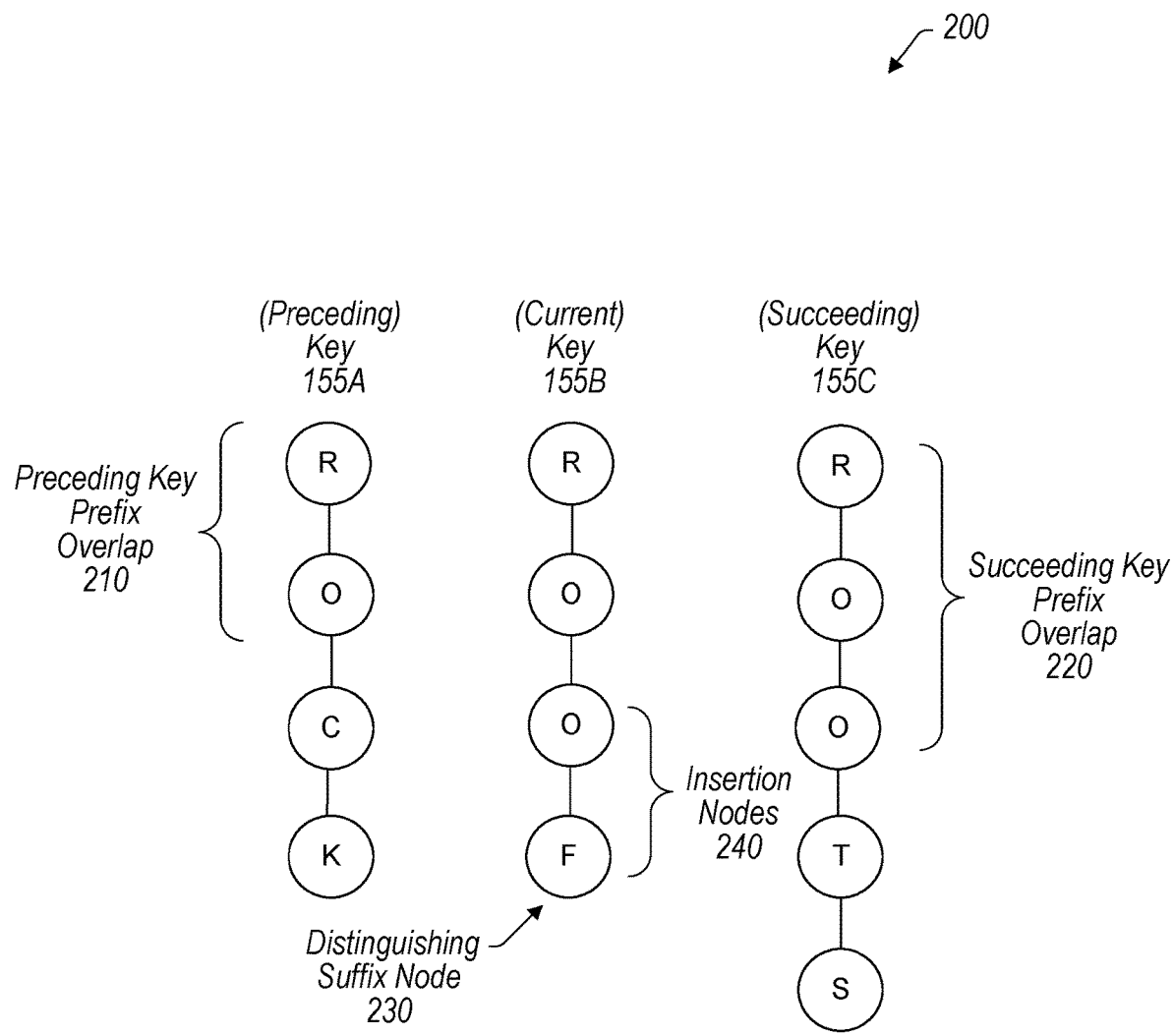
FIG. 2 is a block diagram of an example set of sorted keys used in building a multi-level data structure.

Turning now to FIG. 2, an example 200 of a set of three example keys 155 is depicted including a current key 155B that is being inserted into an ML data structure 160. FIG. 2 provides an illustration about how the comparisons of current key 155B with both a preceding key 155A and a succeeding key 155C (according to key-sorted order) provide an advantage of being able to figure out the least number of nodes (corresponding to characters of current key 155B) to be inserted into an ML data structure 160 that is able to provide a differentiation of current key 155B from both preceding key 155A and succeeding key 155C.

In the example of FIG. 2, preceding key 155A corresponds to a record 150 that is written to database 110 before the database record(s) 150 of current key 155B while succeeding key 155C corresponds to a record 150 that is to be written after the writing of the database record(s) of current key 155B. As shown, preceding key 155A comprises four nodes "R", "O", "C", and "K"; current key 155B comprises four nodes "R", "O", "O", and "F"; and succeeding key 155C comprises five nodes "R", "O", "O", "T", and "S". The availability of both preceding key 155A and succeeding key 155C allows for an ML data structure 160 to be built in an efficient manner, as explained below.

Regarding the building of an ML data structure 160 efficiently, in various embodiments, ML management module 130 performs a comparison between preceding key 155A and current key 155B to determine the number of nodes that are shared between the two keys 155. In the specific example depicted in FIG. 2, there are 2 nodes ("RO") shared between preceding key 155A ("ROCK") and current key 155B ("ROOF")—this shared overlap is shown as preceding key prefix overlap 210. Based on preceding key prefix overlap 210, in various embodiments, ML management module 130 determines a level at which to start inserting information about current key 155B into an ML data structure 160. This is because nodes that are shared between preceding key 155A and current key 155B have already been inserted when preceding key 155A was added and thus that prefix portion of current key 155B does not need to be added again. Consequently, ML management module 130 may determine an intermediate level of ML data structure 160 that occurs after those levels that include the nodes for the shared portion between preceding key 155A and current key 155B. As a result, when adding current key 155B, ML management module 130 can skip traversing the levels associated with those already added nodes, thus saving time.

In various embodiments, ML management module 130 also performs a comparison between current key 155B and succeeding key 155C to determine succeeding key prefix overlap 220, i.e., the number of nodes that are shared between those two keys 155. As shown in FIG. 2, there are 3 nodes ("ROO") shared between current key 155B ("ROOF") and succeeding key 155C ("ROOTS"). Based on this comparison and the one mentioned above, ML management module 130 may calculates a number of prefix nodes to insert in an ML data structure 160 as 1) the difference between the number of shared nodes between current key 155B with succeeding key 155C and the number of shared nodes between current key 155B with preceding key 155A and 2) one distinguishing suffix node 230. In the specific example, ML management module 130 determines the number of prefix nodes to be (3−2)=1 prefix node (i.e., the node "O").

Subsequently, ML management module 130 determines a distinguishing suffix node 230 as the one node that distinguishes current key 155B from succeeding key 155C, that being the node "F" in the example of FIG. 2. Finally, ML management module 130 determines insertion nodes 240 to represent the minimum number of nodes that would distinguish current key 155B from both preceding key 155A and succeeding key 155C. As noted, a minimum 1 prefix node and 1 suffix node are to be inserted into the ML data structure for current key 155B to be distinguishable. In other words, in various embodiments, only the minimum nodes that distinguish the current key 155B are inserted into an ML data structure 160, and not necessarily all the nodes of current key 155B. In the specific example shown in FIG. 2, these nodes are prefix node "O", and suffix node "F".

By following the steps described above, ML management module 130 determines the minimum number of nodes from current key 155B to insert into an ML data structure 160. Thus, the size of ML data structure 160 is kept to a minimum in system memory 140. Also, being able to precisely determine the size of ML data structure 160 at the stage of insertion of each current key 155B by determining the number of prefix nodes and one suffix node prior to the insertion of the nodes into an ML data structure 160, ML management module 130 provides an advantage of being able to prevent the size of an ML data structure 160 from exceeding a predetermined memory budget. In some embodiments, if the memory budget is about to be exceeded, then the insertion of current key 155B may be skipped. An example illustration of an ML data structure 160 is shown with reference to FIG. 3A next as a vector comprising multiple levels. Each vector represents a vector of nodes at a particular level of an ML data structure 160.

Figure 3A:
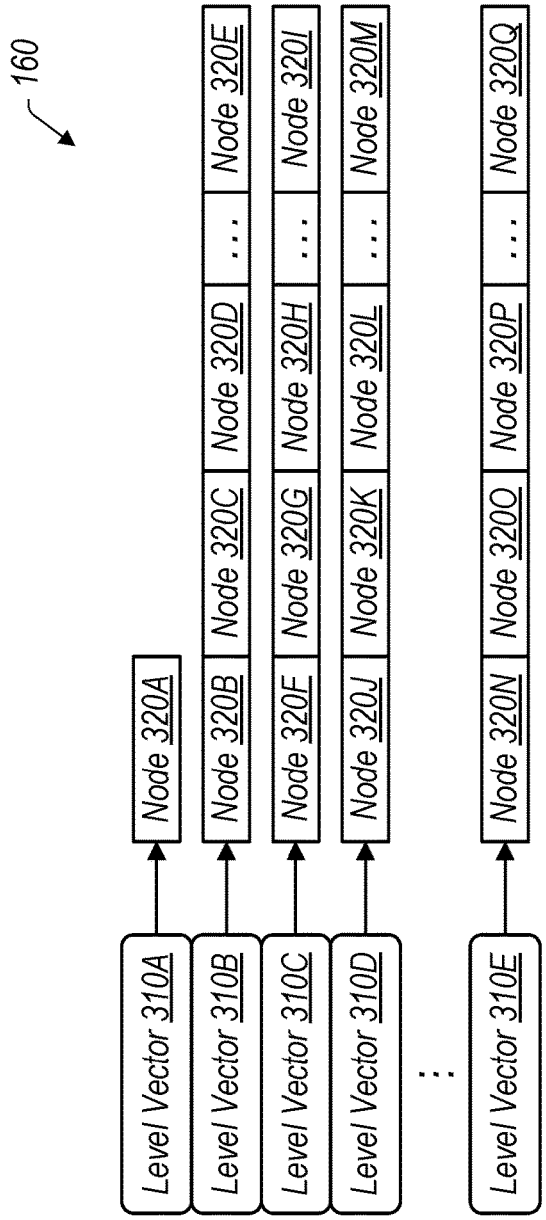
FIGS. 3A and 3B are block diagrams illustrating, respectively, broad categories and general examples of nodes that form the levels of a multi-level data structure, and the component parts of a given node.
Figure 3B:
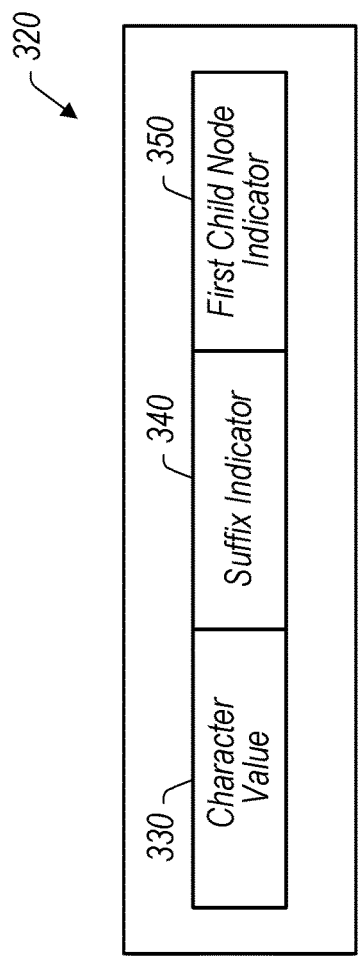

Turning now to FIGS. 3A and 3B, FIG. 3A depicts a general example of an ML data structure 160 and FIG. 3B illustrates an example embodiment of a node 320 included in an ML data structure 160. In the example of FIG. 3A, level vector 310A includes node 320A, which serves as the root node at level 0 in the illustrated ML data structure 160. As noted, each level of the ML data structure 160 may be a vector of nodes. At level 0 in the ML data structure 160, only a root character may be inserted that does not represent a node in any key 155, but rather includes metadata for interpreting the ML data structure 160 (e.g., the metadata may indicate the number of keys 155 inserted into the ML data structure 160). Level vector 310B represents nodes at level 1 in the ML data structure 160, where the first node of each key 155 that is unique from the preceding keys 155 is inserted into the ML data structure 160 at level 1. In the illustrated embodiment, level vector 310B is shown to include nodes 320B, 320C, 320D, and 320E. Level vector 310C represents nodes 320 at level 2. The insertion of nodes 320 based on a current key 155 begins at level 2 if the current key 155 shares exactly one node with the preceding key 155. In the illustrated embodiment, level vector 310C includes a vector of nodes 320F, 320G, 320H, 320I. Similarly, level vector 310D represents nodes at level 3. The insertion of nodes from a current key 155 begins at level 3 if the current key 155 shares exactly two nodes with the preceding key 155. In the illustrated embodiment, level vector 310D includes a vector of nodes 320J, 320K, 320L, 320M. Finally, level vector 310E represents nodes at level "n". The insertion of nodes from a current key 155 begins at level "n" if the current key 155 shares exactly "n" nodes with the preceding key 155. In the illustrated embodiment, level vector 310E includes a vector of nodes 320N, 320O, 320P, 320Q.

In the example of FIG. 3B, the contents of a node 320 that is inserted into a level vector 310 of an ML data structure 160 is depicted. In some embodiments, a node 320 of the ML data structure 160 includes a character value 330 that represents the node/character from the key 155 that is being inserted into the level vector 310. Furthermore, a node 320 may include a suffix indicator 340 to indicate whether the node is a suffix node. In various cases, suffix indicator 340 may be a bit. As such, if suffix indicator 340 is set to 1, then the node is a suffix node, otherwise, it is a prefix node). If a node 320 is a suffix node, then ML management module 130 may determine that it has reached the end of a key 155. A node 320 may also include a first child node indicator 350 that indicates whether the node is a first child node.

Together, FIGS. 3A and B illustrate an organization of an ML data structure 160 as a vector consisting of multiple levels. Such an organization of an ML data structure 160 makes it possible to determine the level at which to start the insertion of nodes 320 in the ML data structure 160 without traversing any of the preceding levels in the ML data structure 160. This represents an advantage provided by the present disclosure about building a ML data structure 160 efficiently in system memory 140.

Turning now to FIG. 4, a block diagram 400 of an example embodiment of ML management module 130 is depicted. In the illustrated embodiment, ML management module 130 includes a key comparator module 410 and a node inserter module 420. The steps of an algorithm for inserting a particular key 155 in a ML data structure 160 are described next. In some embodiments, the steps described below are implemented by ML management module 130.

For adding a particular key 155, ML management module 130 may first determine:

a) Shared bytes with preceding key: $SB_{n,\ n-1}$
b) Shared bytes with succeeding key: $SB_{n+1,\ n}$ Next, ML management module 130 may determine a number of prefix nodes "p" to be inserted into the MIL data structure, as follows.

if ($SB_{n+1,\ n} > SB_{n,\ n-1}$)
$p = SB_{n+1,\ n} - SB_{n,\ n-1}$
else
$p = 0$ As noted, one (1) suffix node may be added to an ML data structure 160 for a minimum differentiation of the particular key 155 with the succeeding key 155 to be added. Since the size of (p+1) nodes are known, the size requirement of adding the particular key 155 is known prior to adding the nodes for the particular key 155. If there is not enough space in the ML data structure 160 to add the nodes (according to a predefined size limit of the ML data structure 160), then the nodes may not be added. This provides an advantage of enforcing a tight memory bound on the size of the ML data structure 160. Before adding a key 155 to the ML data structure 160, the last entry in the vector at level=$SB_{n,\ n-1}$ may be read. This is the last byte that is shared between the preceding key 155 and the current, particular key 155. The addition of the nodes for the particular key 155 may be performed by adding a new branch from the next level in the ML data structure 160. If the first child node indicator 350 is set in the last entry, then the first child node indicator 350 in the node at the next level may not be set, and vice versa. In various embodiments, the algorithm loops through all levels from [$SB_{n,\ n-1}+1$, $SB_{n,\ n-1}+p$] and for each level, a node is appended to the level vector 310 at the level, if the level vector 310 exists. If the level vector 310 does not exist at that level, then the node 320 is added after creating a new level vector 310 at the level. Finally, as alluded to previously, one (1) suffix node 320 is appended at level $SB_{n,\ n-1}+p+1$.

Key comparator module 410, in various embodiments, is a set of software routines executable to perform a comparison of current, preceding, and succeeding keys 155 to determine the number of nodes 320 to insert into an ML data structure 160. These comparisons may allow key comparator module 410 to determine the number of prefix nodes 320 and one suffix node 320 to be inserted into an ML data structure 160 corresponding to the insertion of the current key 155 into the ML data structure 160. In various embodiments, key comparator module 410 implements the steps of the algorithm that relate to comparison of keys 155. As noted, key comparator module 410 compares a current key 155 with both a preceding key 155 and a succeeding key 155 in order to determine the number of nodes 320 to insert into an ML data structure 160. As alluded to previously, key comparator module 410 may also determine the level at which to start inserting the determined number nodes 320 through the comparison of the current key 155 with the preceding key 155.

Node inserter module 420, in various embodiments, is a set of software routines executable to perform an insertion of the determined number of nodes 320 into an ML data structure 160. Node inserter module 420 interfaces with key comparator module 410 to obtain information about what nodes 320 to insert into an ML data structure 160. Key comparator module 410 may also inform node inserter module 420 about the starting level from which to start inserting the nodes 320 for the current key 155. For each node 320 inserted into the ML data structure 160, in various embodiments, node inserter module 420 inserts a character value 330 representing that node 320 of the key 155 being inserted. Further, node inserter module 420 may determine whether to set the suffix indicator 340 and/or the first child node indicator 350 for the node 320. Thus, node inserter module 420 may be responsible for ensuring that each node 320 added to the ML data structure 160 is inserted at the appropriate level, and that the suffix indicator 340 and the first child node indicator 350 are set to correct values for each node 320. The setting of the suffix indicator 340 and the first child node indicator 350 enable proper read-back of the keys 155 based on the nodes 320 inserted in the ML data structure 160. It may be noted that not all characters of each key 155 are inserted into the ML data structure 160, since for managing the overall size of the ML data structure 160, node inserter module 420 may insert only the minimum number of nodes 320 that provides a differentiation of a current key 155 from both the preceding and succeeding keys 155. In some embodiments, node inserter module 420 may provide the flexibility of appending the nodes in parallel to each relevant level vector 310 of the ML data structure 160, thus further accentuating the advantage of not having to traverse the ML data structure for inserting nodes. A specific example of the insertion of a particular set of keys 155 into an ML data structure 160 is depicted next with reference to FIG. 5.

Figure 5:
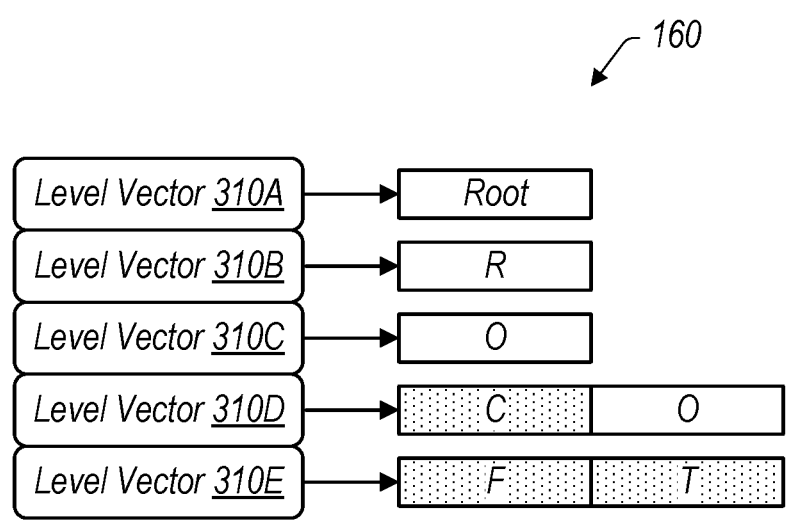
FIG. 5 is a block diagram of an example multi-level data structure after the insertion of an ordered set of keys.

Turning now to FIG. 5, an example of the state of an ML data structure 160 is illustrated after the insertion of example keys 155 "ROCK", "ROOF", and "ROOTS". As shown in FIG. 5, level vector 310A is the root level of the illustrated ML data structure 160 (designated as "Root") and does not represent a node 320 belonging to any of the keys 155 being inserted. Starting with the insertion of key 155 "ROCK", it may not be first compared with a preceding key 155 as it is the first key 155 inserted. Hence, there is no preceding key prefix overlap 210 and thus $SB_{n, n-1}=0$. The key 155 "ROCK" may then be compared to the succeeding key 155 "ROOF". There are 2 characters in common ("RO") and thus $SB_{n+1, n}=2$. Hence, the number of prefix nodes 320 is determined as p=2 that are designated as prefix nodes 320, and those are inserted starting at level 1. Thus, a node 320 "R" is inserted in level vector 310B at level 1, and a node 320 "O" is inserted in level vector 310C at level 2. For each of those nodes 320, the suffix indicator 340 is set to 0, to indicate that the nodes 320 are prefix nodes 320. One suffix node 320 is then added to level vector 310D as the character "C", since that represents the one character that provides a minimum differentiation of the current key 155 "ROCK" with the succeeding key "ROOF". The suffix indicator 340 for that node 320 added at level 3 is set to 1, to indicate that the node 320 is a suffix node. The first child node indicator 350 may be set to 1 for the nodes added at each level of the ML data structure, since these nodes are the first child at each level.

Continuing with the insertion of key 155 "ROOF", it may first be compared to the preceding key 155 "ROCK". For this example, $SB_{n, n-1}=2$, since characters R and O are shared between the current key 155 "ROOF" and the preceding key 155 "ROCK". Also, $SB_{n+1, n}=3$, since characters "R", "O", and "O" are shared between the current key 155 and the succeeding key 155 "ROOTS". Hence, p=3−2=1. Thus, one prefix node 320, the character "O", may be inserted into the MlL data structure 160. The level at which the prefix node 320 will be inserted is at level 3, since the characters at the first two levels of the ML data structure 160 have already been inserted while adding the preceding key 155 "ROCK". Thus, a node 320 "O" is inserted in level vector 310D at level 3 with the suffix indicator 340 being set to 0, to indicate that the node 320 is a prefix node 320. The first child node indicator 350 for the node 230 added to level vector 310D may be set to 0 since it is not the first child node 320 at that level. One suffix node may then be added to level vector 310E as the character "F", since that represents the one character that provides a minimum differentiation of the current key 155 "ROOF" with the succeeding key 155 "ROOTS". For the node added to level vector 310D, the suffix indicator 340 may be set to 1 (to indicate that it is a suffix node), and the first child node indicator 350 is set to 1 (to indicate that it is the first child node for level vector 310D).

Finally, with regards to the insertion of the key 155 "ROOTS", it may first be compared to the preceding key 155 "ROOF". For this example, $SB_{n, n-1}=3$, since characters "R" and "O" are shared between the current key 155 and the preceding key 155. Also, $SB_{n+1, n}=0$, since there is no succeeding key 155 for comparison with the current key 155. Hence, p=0, and thus no prefix nodes may be inserted in the ML data structure 160 for this current key 155. Since $SB_{n, n-1}=3$, hence, the level to add one suffix node 320 to the ML data structure 160 is level 4. The character to add as a suffix node 320 is "T" in level vector 310E, since that represents the one character that provides a minimum differentiation of the current key 155 "ROOTS" with the preceding key 155 "ROOF". Note that the determination of the suffix character may be done by comparing with the preceding key 155 in case there is no succeeding key to compare the current key with. For the node 320 added to level vector 310E, the suffix indicator 340 is set to 1 (to indicate that it is a suffix node 320), and the first child node indicator 350 is set to 1 (to indicate that it is the first child node 320 for level vector 310E). This completes the description of the insertion of the example keys 155 "ROCK", "ROOF", and "ROOTS" into the ML data structure 160. The example illustrates the advantages of avoidance of traversal of prior levels while inserting nodes, and of being able to respect a predetermined limit of a memory budget for the ML data structure. With the description of the algorithm and specific example of insertion of particular set of keys into a ML data structure having been provided with respect to FIGS. 4 and 5, a couple of example methods for building the ML data structure in an efficient manner is provided next.

Figure 6:
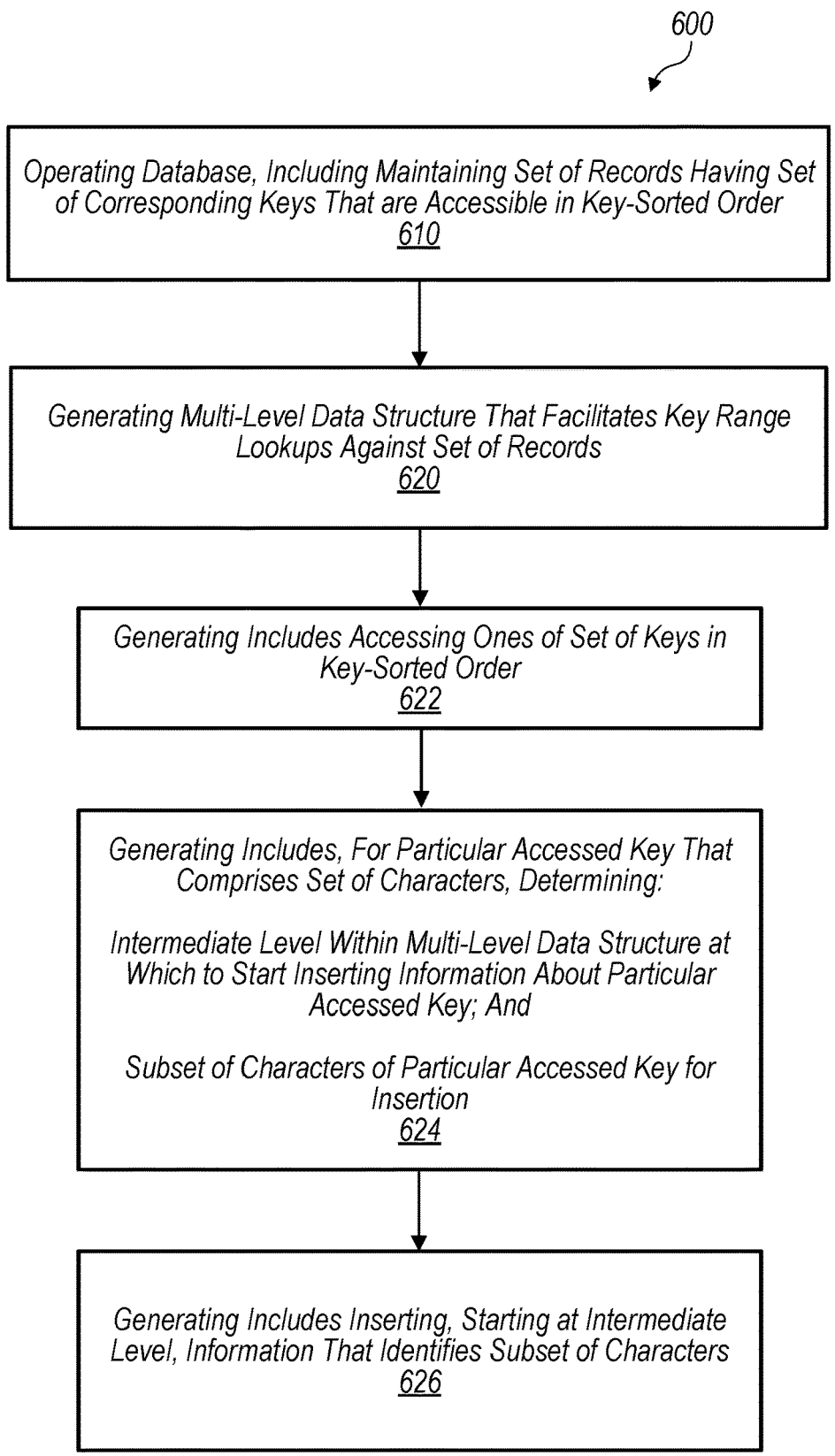
FIGS. 6 and 7 are flow diagrams illustrating example methods that relate to building a multi-level data structure by inserting a set of sorted keys into the multi-level data structure, according to some embodiments.

Turning now to FIG. 6, a flowchart of an example method 600 implemented by a database node is shown. In the illustrated embodiment, at step 610, a computer system (e.g., database node 120) operates a database, including maintaining a set of records having a set of corresponding keys that are accessible in key-sorted order. In some embodiments, the set of records in the database is maintained as a LSM tree data structure; however, the records may be initially written to a memory of the computer system (e.g., records 150 in system memory 140). When the size of the records exceeds a particular threshold, the set of records are written to persistence storage (e.g., to files 115) in a sorted order of the keys of the records.

At step 620, the computer system generates a multi-level data structure (e.g., an ML data structure 160) that facilitates key range lookups against the set of records. In some embodiments, the generation of the ML data structure takes place at the time when database records are being written from memory to persistence storage. Details about the steps for generating an example ML data structure have been discussed with reference to FIGS. 2-5. Note that when the ML data structure is used for key range lookups, it is able to correctly determine with accuracy whether a key (or a range of keys) is not present in the ML data structure. But the ML data structure may not always indicate that a particular key is present in a corresponding file comprising a set of database records. The reason for this is that only a minimum set of characters from a particular key is stored in the ML data structure that provides a minimum distinguishing of the particular key from a preceding and a succeeding key. Thus, if the ML data structure includes a key prefix of ROOF, and a key with characters ROOFER is searched, then the ML data structure may indicate that the searched key is possibly present in the corresponding file of database records. In such cases, an actual search of the file with database records would truly reveal the presence or absence of the searched key in the set of database records.

At step 622, the computer system continues with the generation of the multi-level data structure whereby the generating includes accessing ones of set of keys in key-sorted order. For example, the accessed key is designated as a current key 155 in FIGS. 2-5.

At step 624, the computer system continues with the generation of the multi-level data structure whereby the generating further includes, for particular accessed key that comprises set of characters, determining intermediate level within multi-level data structure at which to start inserting information about particular accessed key, and determining a subset of characters of particular accessed key for insertion. In some embodiments, as described above with reference to FIGS. 4 and 5, the determination of the intermediate level at which to start inserting nodes from the particular accessed key involves the comparison of the particular key with a preceding and a succeeding key in the sorted order of the keys.

At step 626, the computer system further continues with the generation of the multi-level data structure whereby the generating includes inserting, starting at intermediate level, information that identifies subset of characters. In some embodiments, the comparison of the particular key with a preceding and a succeeding key not only determines the level at which to start inserting nodes into the ML data structure but also identifies the subset of characters that minimally distinguish the particular key from all other keys in the set of database records in memory.

Figure 7:
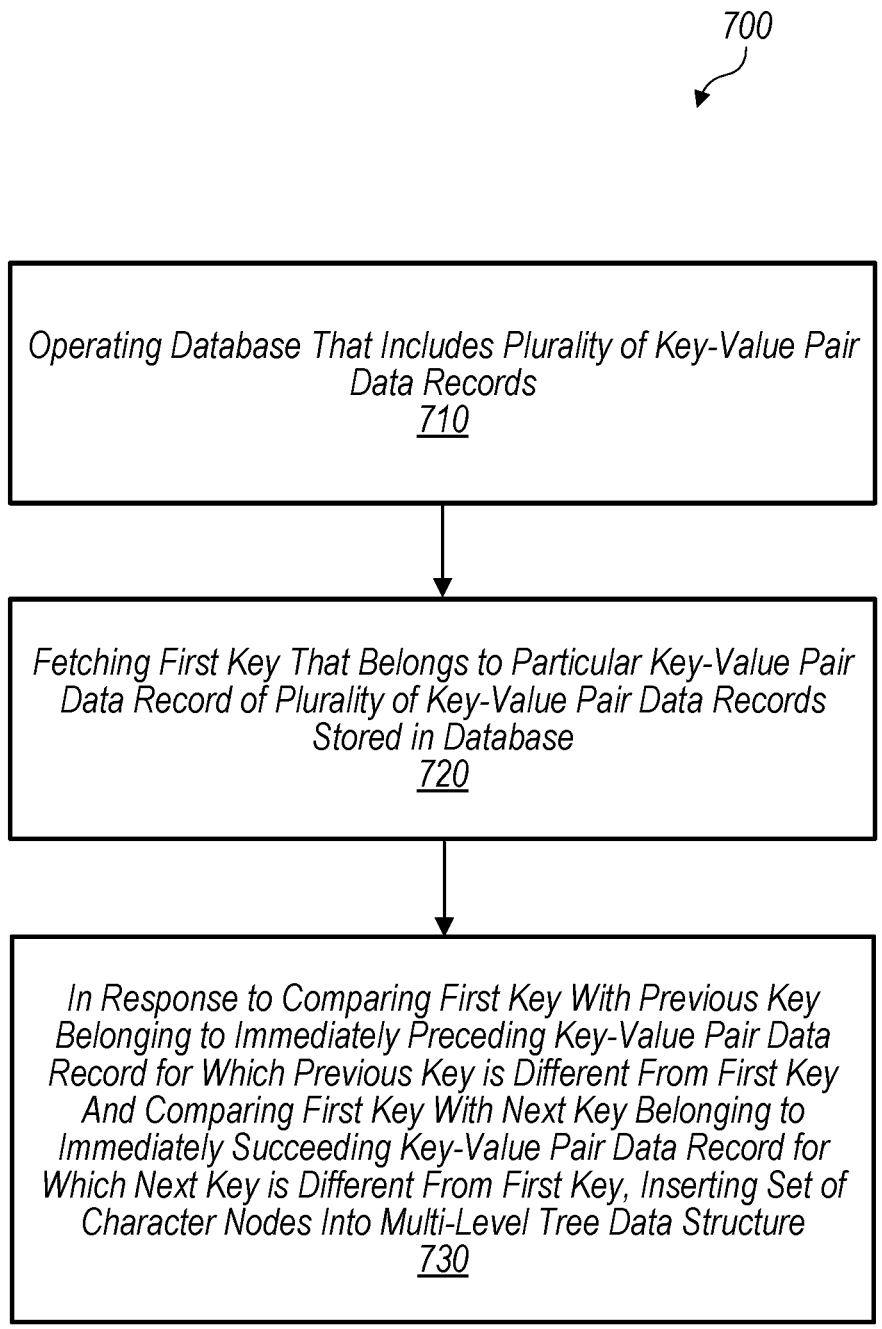

Turning now to FIG. 7, a flowchart of an example method 700 implemented by a database node is shown. Method 700 has similarities and overlap to method 600 described with respect to FIG. 6. At step 710, a computer system (e.g., database node 120) operates a database that includes plurality of key-value pair data records. As noted, when writing the data records from memory to persistent storage, the records are written in a sorted order of the keys.

At step 720, the computer system fetches a first key that belongs to particular key-value pair data record of plurality of key-value pair data records stored in database. In some embodiments, the availability of keys in a sorted order presents an opportunity to compare a particular key with a preceding and a succeeding key while the records corresponding to those keys are present in system memory. This allows those records to be accessed without cache misses.

At step 730, the computer system, in response to comparing first key with preceding key belonging to immediately preceding key-value pair data record for which preceding key is different from first key and comparing first key with succeeding key belonging to immediately succeeding key-value pair data record for which succeeding key is different from first key, inserts a set of character nodes into multi-level tree data structure. In some embodiments, the ML data structure is implemented as vector of multiple levels of vectors. As alluded to previously with reference to FIGS. 4 and 5, the comparison of a first key with a preceding and a succeeding key enables the determination of a level in the ML data structure at which to start inserting nodes from the first key into the ML data structure. Advantageously, the organization of the ML data structure as a vector of multiple levels of vectors allows the insertion to occur without traversing any of the previous levels of the ML data structure.

Exemplary Multi-Tenant Database System

Figure 8:
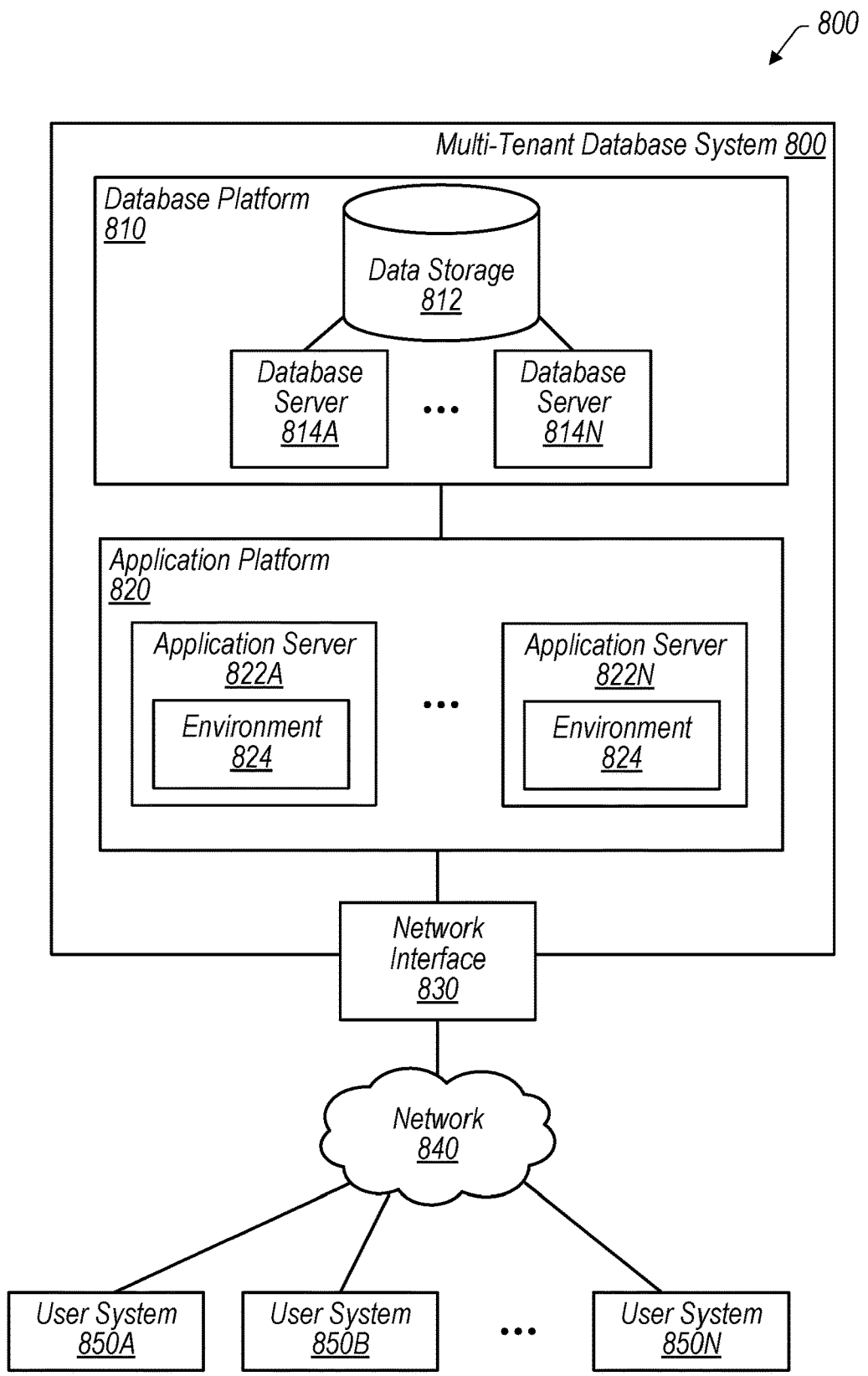
FIG. 8 is a block diagram illustrating elements of a multi-tenant system, according to some embodiments.

Turning now to FIG. 8, an exemplary multi-tenant database system (MTS) 800 in which various techniques of the present disclosure can be implemented is shown—e.g., system 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database 110) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files (e.g., files 115) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812).

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key.

Database servers 814, in various embodiments, are hardware elements, software routines, or a combination thereof capable of providing database services, such as data storage, data retrieval, and/or data manipulation. A database server 814 may correspond to database node 120. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object-oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
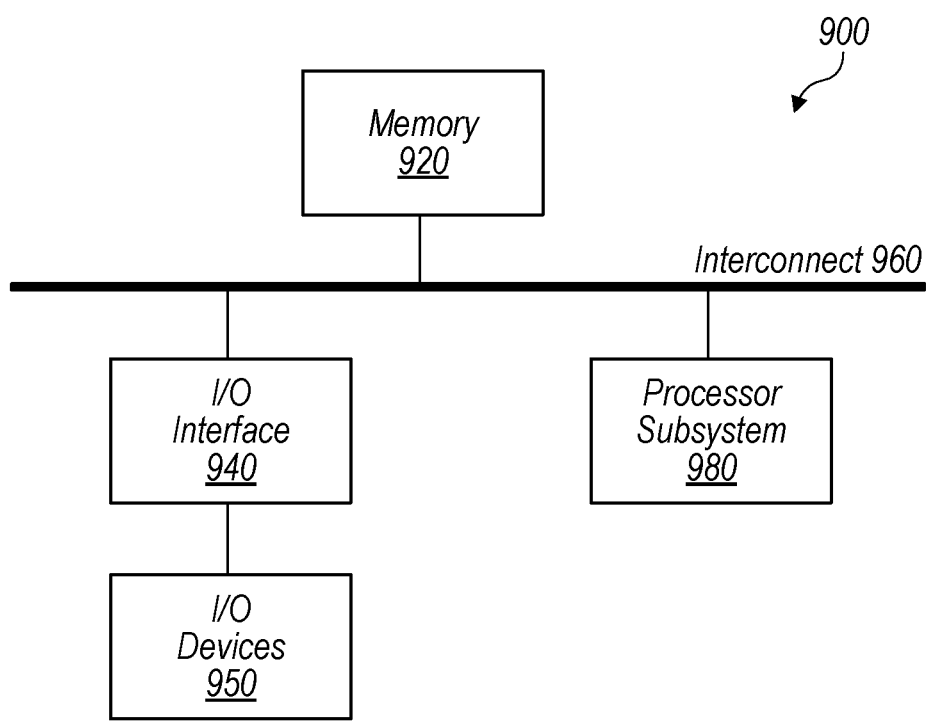
FIG. 9 is a block diagram of one embodiment of a computer system for implementing various systems described in the present disclosure.

Turning now to FIG. 9, a block diagram of an exemplary computer system 900, which may implement system 100, database 110, database node 120, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement ML management module 130 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail above (e.g., ML management module 130, key comparator module 410, node inserter module 420, etc.).

What is claimed is:

1. A method, comprising:
    storing, by a computer system, a set of records having a set of corresponding keys that are accessible in key-sorted order; and
    generating, by the computer system, a multi-level data structure that facilitates key range lookups against the set of records, wherein the generating includes performing an insertion of a particular one of the set of corresponding keys by:
        determining, based on a first amount of overlap between the particular key and a preceding key that precedes the particular key in the key-sorted order, an intermediate level within the multi-level data structure at which to start inserting information about the particular key; and
        determining, based on a second amount of overlap between the particular key and a succeeding key that succeeds the particular key in the key-sorted order, a number of characters of the particular key to insert, wherein the number of characters is based on a difference between the first and second amounts of overlap; and
        inserting, into the multi-level data structure and starting at the intermediate level, information that identifies a subset of characters of the particular key corresponding to the determined number of characters to insert, wherein the inserting is performed without traversing any levels before the intermediate level.

2. The method of claim 1, wherein the first amount of overlap corresponds to a shared prefix between the particular key and the preceding key.

3. The method of claim 2, wherein the intermediate level is a level that is subsequent to a set of levels corresponding to the shared prefix.

4. The method of claim 2, wherein the subset of characters includes characters that are after the shared prefix.

5. The method of claim 1, wherein the multi-level data structure includes a plurality of level vectors, each of which corresponds to a level of the multi-level data structure and includes a set of nodes that store information about characters of keys.

6. The method of claim 5, wherein the information that identifies the subset of characters is inserted such that information for a given one of the subset of characters is inserted into a different one of the plurality of level vectors than information for any other character in the subset of characters.

7. The method of claim 5, wherein a particular one of the set of nodes includes an indication specifying whether the particular node is a suffix node.

8. The method of claim 5, wherein a particular one of the set of nodes includes an indication specifying whether the particular node is a first child node.

9. A non-transitory computer-readable medium having program instructions stored thereon that are capable of causing a server computer system to perform operations comprising:
    storing a set of records having a set of corresponding keys that are accessible in key-sorted order; and
    generating a multi-level data structure that facilitates key range lookups against the set of records, wherein the generating includes performing an insertion of a particular one of the set of corresponding keys by:
        determining, based on a first amount of overlap between the particular key and a preceding key that precedes the particular key in the key-sorted order, an intermediate level within the multi-level data structure at which to start inserting information about the particular key; and
        determining, based on a second amount of overlap between the particular key and a succeeding key that succeeds the particular key in the key-sorted order, a number of characters of the particular key to insert, wherein the number of characters is based on a difference between the first and second amounts of overlap; and inserting, into the multi-level data structure and starting at the intermediate level, information that identifies a subset of characters of the particular key corresponding to the determined number of characters to insert, wherein the inserting is performed without traversing any levels before the intermediate level.

10. The medium of claim 9, wherein the multi-level data structure includes a plurality of level vectors, each of which corresponds to a level of the multi-level data structure and includes a set of nodes that store information about characters of keys.

11. The medium of claim 10, wherein the information that identifies the subset of characters is inserted such that information about a character in the subset of characters is inserted into a node at a particular level within the multi-level data structure, wherein the particular level at which the information about the character is inserted is different than the level for any other character in the subset of characters.

12. The medium of claim 10, wherein the information that identifies the subset of characters is inserted by appending a set of corresponding nodes for the subset of characters to one or more of the plurality of level vectors.

13. The medium of claim 12, wherein a given one of the set of corresponding nodes includes an indication specifying whether the given node is a suffix node.

14. A method, comprising:

operating, by a computer system, a database that includes a plurality of key-value pair data records, wherein the plurality of key-value pair data records is accessible in a sorted order based on keys corresponding to the plurality of key-value pair data records;

fetching, by the computer system, a first key that belongs to a particular key-value pair data record of the plurality of key-value pair data records stored in the database; and determining, by the computer system, an intermediate level within a multi-level tree data structure based on a first amount of overlap between the first key and a preceding key belonging to an immediately preceding key-value pair data record for which the preceding key is different from the first key;

determining, by the computer system, a number of characters of the first key to insert based on a difference between the first amount of overlap and a second amount of overlap between the first key and a succeeding key belonging to an immediately succeeding key-value pair data record for which the succeeding key is different from the first key; and inserting, by the computer system, a set of character nodes into the multi-level tree data structure that corresponds to the determined number of characters, wherein the inserting is performed starting at the intermediate level in the multi-level tree data structure without traversing any levels before the intermediate level in the multi-level tree data structure.

15. The method of claim 14, further comprising:

designating, by the computer system, one of the set of character nodes as a suffix node that indicates a last node in a series of the character nodes for the first key.

16. The method of claim 14, wherein at least two of the set of character nodes are inserted into different levels of the multi-level tree data structure.

17. The method of claim 14, further comprising:

determining, by the computer system, whether a size of the set of characters nodes exceeds a remaining storage capacity of the multi-level tree data structure; and in response to determining that the size of the set of characters nodes does not exceed the remaining storage capacity, the computer system inserting the set of character nodes into the multi-level tree data structure.

* * * * *